Feb. 16, 1971

M. MARKO 3,563,855

ENERGY ABSORBER STRUCTURE FOR A NUCLEAR
POWER PLANT CONTAINMENT SYSTEM

Filed Nov. 12, 1968

INVENTOR.
MYROSLAW MARKO

BY Donald J. Ellingsberg

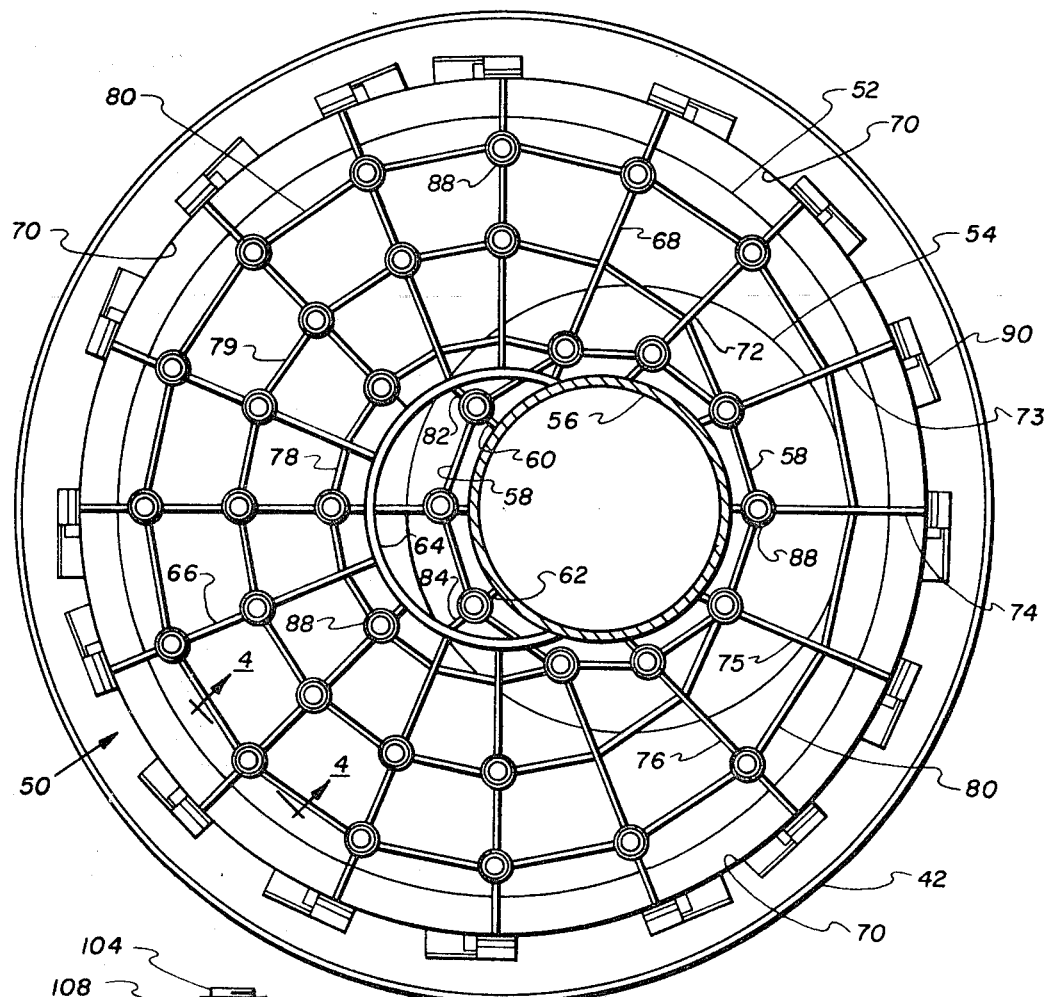
FIG. 3
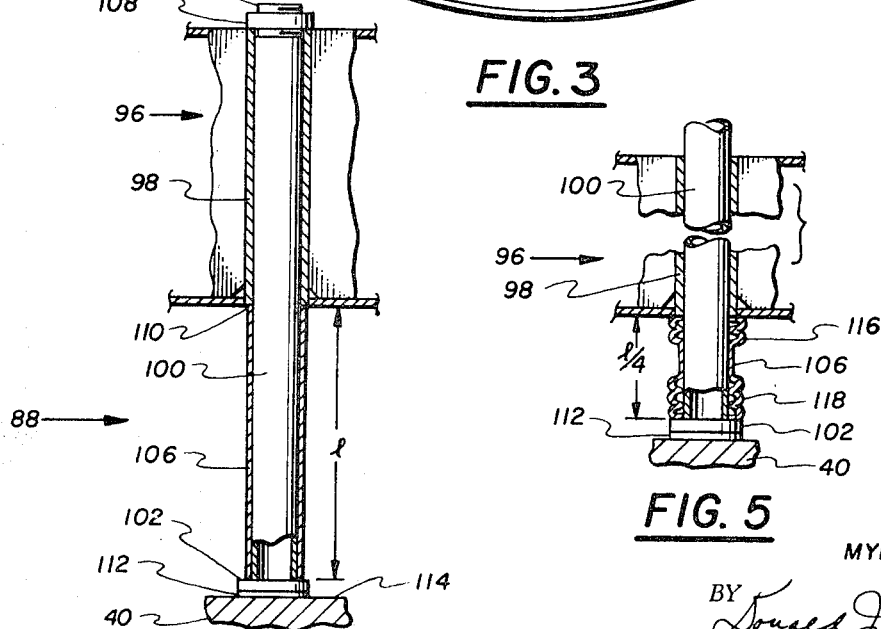
FIG. 4
FIG. 5
INVENTOR.
MYROSLAW MARKO
BY Donald J. Ellingsberg

United States Patent Office 3,563,855
Patented Feb. 16, 1971

3,563,855
ENERGY ABSORBER STRUCTURE FOR A NUCLEAR POWER PLANT CONTAINMENT SYSTEM
Myroslaw Marko, Canoga Park, Calif., assignor to North American Rockwell Corporation
Filed Nov. 12, 1968, Ser. No. 774,755
Int. Cl. G21c 9/00
U.S. Cl. 176—38                                    11 Claims

ABSTRACT OF THE DISCLOSURE

The mechanical integrity of a nuclear power plant containment system is maintained by limiting the motion of the top shield assembly of a nuclear reactor by an energy absorber structure that absorbs the energy imparted to the top shield assembly by a maximum accident in the reactor core which has an equivalent energy release of hundreds of pounds of TNT, and transmits the resulting force load directly to the reactor building structure.

BACKGROUND OF THE INVENTION

Nuclear power plants use the heat of nuclear fission to generate steam which drives a turbine-generator and produces electrical power. The basic parts of a nuclear power plant are (1) a reactor vessel that contains fuel such as uranium or plutonium in various forms, (2) a coolant system that transfers the heat from the fission reaction in the fuel to a steam generator, (3) a steam driven turbine-generator set that produces electrical power, and (4) a containment system for the reactor that includes radiation shielding and radioactive containment which contains any radioactive material that the plant generates.

In the containment aspect of nuclear power plant safety, radioactive products account for nearly all the radioactivity. Large amounts of radioactive products can be expected to escape their normal confinement in the reactor fuel if a major accident occurs such as a meltdown of the core containing the reactor fuel. Since these radioactive products must be contained in the interest of safety, nuclear power plants provides the containment system which includes the now familiar form of the spherical or hemispherical domes in conventional nuclear power plants. Each containment dome is designed to withstand the maximum vapor pressure that may be generated during an accident; however, certain postulated reactor accidents can generate an energy release that could lead to the rupture of the containment dome, and thus, loss of integrity of the containment system.

OBJECTS OF THE INVENTION

Accordingly it is an object of the invention to provide a new and improved energy absorber structure for a nuclear power plant containment system.

It is an object of the invention to provide an energy absorber structure capable of absorbing energy with a constant force through a relatively long stroke.

It is an object of the invention to provide an energy absorber structure capable of maintaining an energy buildup to a preselected level without motion.

It is an object of the invention to provide an energy absorber structure capable of restraining energy-propelled missiles.

It is an object of the invention to provide an energy absorber structure that is removable for ready access to a reactor core in the nuclear power plant.

It is an object of the invention to provide an energy absorber structure that is highly reliable and relatively inexpensive.

SUMMARY OF THE INVENTION

Briefly, in accordance with the invention an energy absorber structure bears upon a top shield assembly and holds the assembly in place during normal nuclear power plant operation and during any pressure increases that do not exceed a determinable value. Assuming, for example, that an explosion were to occur in a reactor vessel where the ensuing blast pressure exceeded the determinable pressure value, the rise of the top shield assembly from its operating position is controlled by a plurality of selectively positioned energy absorber columns that transmit the resulting load to a network of support girders or "strong back." The network of support girders in turn transmits the load directly to the reactor building base though a plurality of anchor-support plates. The controlled rise of the top-shield assembly is dependent upon the energy absorber structure and particularly upon the energy absorber columns.

While the specification concludes with claims particularly pointing out and distinctly claiming the subject matter which may be regarded as the invention, the organization and method of operation, together with further objects, features, and the attending advantages thereof, may best be understood when the following description is read in connection with the accompanying drawings.

BRIEF DESCRIPTION OF THE DRAWINGS

FIG. 3 is a plan view of the energy absorber structure of FIG. 2;

FIG. 4 is a sectional view of one crush column of the energy absorber structure along the line 4—4 of FIG. 3; and FIG. 5 is a sectional view of the crush column of FIG. 4 after a controlled energy-absorptive stroke.

DESCRIPTION OF THE INVENTION

Figure 1:
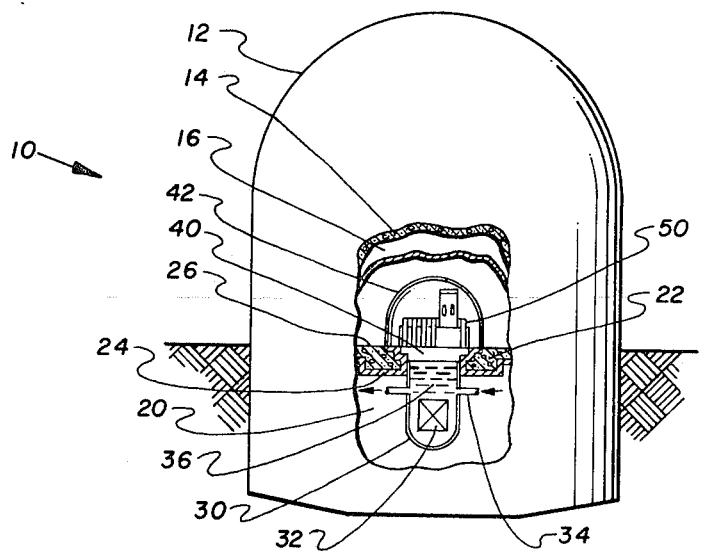
FIG. 1 is an elevation view, partly sectional and partly broken away, of one form of nuclear power plant that includes the energy absorber structure of the invention.

Although a nuclear power plant has several principal buildings, for the purposes of the invention only a reactor building 10 as shown by FIG. 1 will be considered.

The reactor building 10 has a conventional outer containment dome 12 that is a right circular cylinder with a generally flat base and hemispherical head. The containment dome has an outer envelope 14, preferably of reinforced concrete, and an inner barrier envelope 16, preferably a welded metal liner.

A cell or vault 20 within the reactor building 10 is enclosed by a vault wall 22, preferably of reinforced concrete, with a vault barrier liner 24, peferably a welded metal liner. An operating floor 26 in the reactor building 10 is defined by the outer surface of the vault wall 22.

A reactor vessel 30 is positioned within the vault 20 below the level of the operating floor 26. The reactor vessel contains a reactor core 32 of fuel, i.e., fissionable material. A coolant system loop 34 passes a coolant fluid 36 through the reactor vessel and transfers the heat absorbed from the fission reactions in the fuel to a conventional steam generator (not shown). The steam generator generates steam that drives a conventional turbine-generator set which produces electrical power.

A rotatable top shield assembly 40 is removably positioned in the vault wall 22 with its top surface generally flush with the operating floor 26. The top shield assembly 40 covers the reactor vessel 30 and provides radiation shielding for the operating floor area by its conventional stepped design which cooperates with the vault wall 22.

Containment of radioactive material is accomplished by the several containment barriers. The first barrier is the vault barrier line 24 that is attached to and backed up by the vault wall 22, and an inner containment dome 42 preferably formed of metal. The inner containment dome 42 is removably anchored to the vault barrier liner 24 as described hereinafter. The second barrier is the inner barrier envelope 16 on the inside surface of the outer envelope 14 of the outer containment dome 12.

Since the invention is directed to the containment system of a nuclear power plant, brief consideration should be given to understanding what potential problems can occur during operation of a nuclear reactor which may affect the mechanical integrity of the containment system and permit the release of radioactive material thus creating a radiological hazard at the plant site.

Containment as applied to nuclear reactors means the control of radioactive material effluents from "potential reactor accidents of exceedingly low probability of occurrence."[1] These accidents, often referred to as maximum hypothetical accidents, have a probability of occurrence several orders of magnitude below those for which containment protection is provided.

An unprotected loss-of-core cooling has been identified as one maximum hypothetical accident that can result in an energy release in certain nuclear power plant designs equivalent to 160 pounds of TNT with the permanent disassembly of the reactor vessel. When sodium is the coolant fluid, the potential for a sodium vapor expansion also exists. This sodium vapor expansion is assumed to occur when, following the disassembly of the reactor vessel, the molten fuel interacts with the remaining sodium in the reactor core. The sodium vapor expansion can add an additional energy release equivalent to 240 pounds of TNT. Mechanical integrity of the containment system must therefore counter a total of at least 400 pounds of TNT. The containment system must therefore contain an accident substantially in excess of this maximum accident:

In a TNT type explosion, the following events can occur:

(1) A shock wave is generated which, unless attenuated severly in the reactor core, will rupture the reactor vessel.

(2) The ensuing blast pressure will lift the top shield assembly and release radioactive material, e.g., fuel and sodium, into the inner containment dome.

(3) Unless the rise of the top shield assembly is controlled, the top shield will be propelled through the inner containment dome and probably continue in its propelled flight, along with the scattering pieces of the ruptured inner dome, through the outer containment dome thus destroying the integrity of the nuclear power plant containment system.

The energy absorber structure 50 of my invention as shown by FIG. 1, and in greater detail by FIGS. 2 through 5, controls the rise of the top shield assembly 40 and maintains the mechanical integrity of the nuclear power plant containment system.

Figure 2:
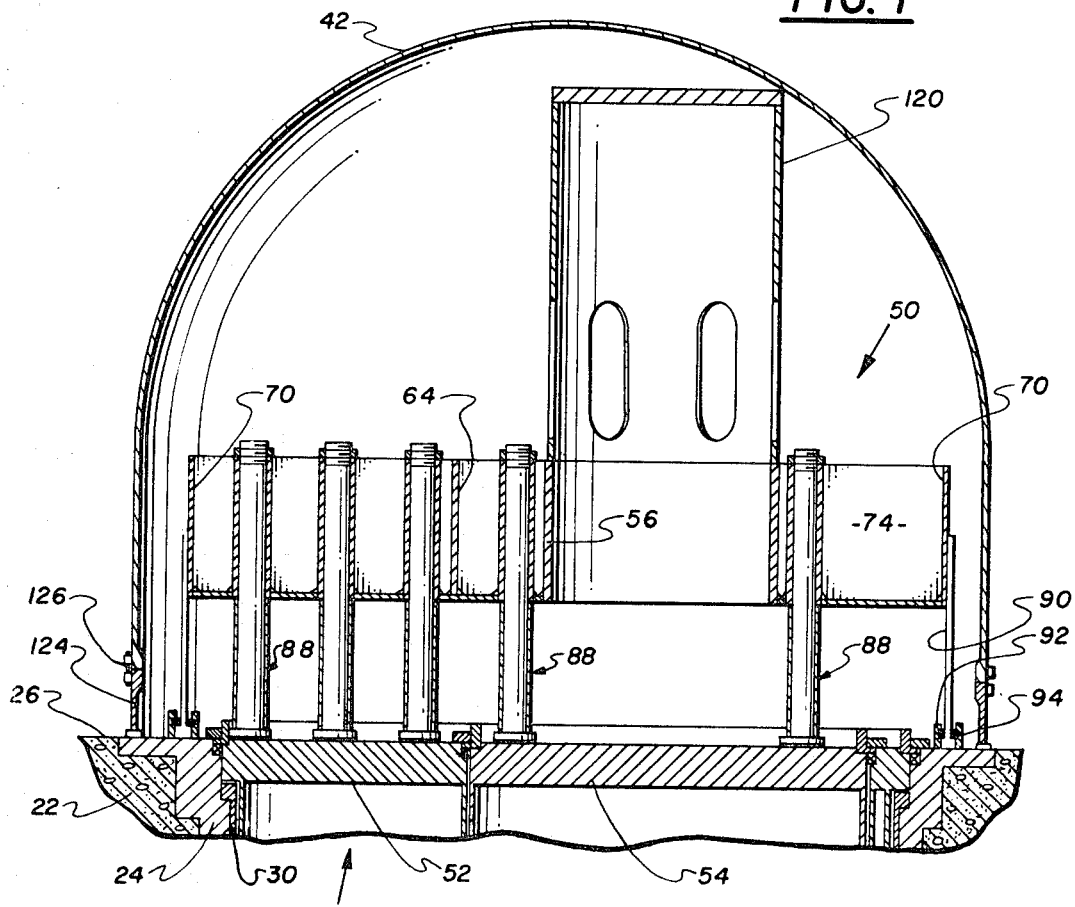
FIG. 2 is a sectional view, partly broken away, of the energy absorber structure of the invention.

Referring to FIGS. 2 and 3, the energy absorber structure 50 of my invention is positioned within the inner containment dome 42 and bears upon the top shield assembly 40 which is the closure for the reactor vessel 30. In the particular embodiment as illustrated, the top shield assembly 40 has two rotating plugs 52 and 54. However, it is contemplated that the reactor vessel closure can have other forms which are determined by the particular parameters of the nuclear power plant, particularly the reactor vessel reactor core, and fuel handling procedure.

---

[1] 10 CFR 50, Appendix A, Federal Register, vol. 32, No. 132, July 11, 1967.

The larger rotating plug 52 is generally concentric with the reactor vessel 30 while the smaller rotating plug 54 has its axis of rotation generally midway between the center and outer edge of the larger plug. The rotating plugs 52 and 54 permit access to all regions within the reactor vessel in a conventional manner. It is important to note that the smaller plug 54 can, in the particular embodiment shown, accommodate conventional control-rod drives and allow for the removal of reactor vessel internals as necessary.

The energy absorber structure 50 as particularly shown by FIG. 3 has a network of support girders that is formed to overlay and complement the top shield assembly 40, particularly the large and small rotating plugs 52 and 54 respectively. A ring member 56, which can receive mechanical reactor components such as conventional control rod drives extending above the surface of the operating floor 26, has a singular circular girder 58 generally concentric with the ring member and spaced therefrom by selected intermediate girders, for example intermediate girders 60 and 62. A sector ring member 64 is connected to the ring member 56. A plurality of radially extending girders, for example, radial girders 66 and 68, originate at and are connected to sector ring member 64. The radially extending girders that originate at the sector ring member 64 terminate at and are connected to an outer ring member 70. Radially extending girders 72, 73, 74, 75, and 76 originate at and are connected to the ring member 56, and terminate at and are connected to the outer ring member 70; in effect, radially extending girders 72, 73, 74, 75, and 76 are positioned along imaginary radial extensions from the imaginary circle patrially developed by the sector ring member 64. Sector girders 78 and 79 are generally concentric with the imaginary circle partially developed by the sector ring member 64 and suitably spaced-apart along the radially extending girders, such as radial girder 66. While sector girder 78 intersects circular girder 58, sector girder 79 complements with a portion of circular girder 58 to develop a composite circular girder concentric with and spaced from circular girder 80. Additional intermediate girders are preferably included in the completed network of support girders where structurally desirable, for example, intermediate girders 82 and 84.

The network of support girders with the ring member, sector ring member, and outer ring member in the embodiment as described is built-up from ribbed metal plates that are suitably connected together; for example, by welded joints. At selected girder intersections—the selected intersections primarily dependent upon uniform loading of the energy absorber structure 50—similar energy absorbing columns 88, which are described hereinafter, are individually connected into the network. The network is positioned above the operating floor 26 by similar anchor-support plates 90 that are connected to the outer ring member 70 at circumferentially spaced locations which generally coincide with the terminals of the radially extending girders. Each anchor-support plate 90 (see FIG. 2) is connected to a holddown ring member 92 by a removable shear lug 94 which can be readily inserted or removed when it becomes necessary to replace or remove the energy absorber structure 50. The holddown ring member 92 is connected to the reactor building, i.e., to the vault barrier liner 24 which is a part of the base of the reactor building.

Referring to FIG. 4, one form of energy absorbing column 88 that can be used in the energy absorbing structure 50 of my invention extends from the network of support girders 96 and bears upon the top shield assembly 40. The energy absorbing column 88 has a guide sleeve 98 connected into the network, preferably at a selected intersection of girders. A guide member such as guide tube 100 that has a head or pad 102 and a threaded end 104 extends through both a cylinderical shell 106 and the guide sleeve 98, and is retained by an adjustable threaded collar 108. The collar 108 is adjusted so that the cylindrical shell 106, which has a normal length $l$, is maintained under a slight compressive load between the pad 102 and the facing surface 110 of the guide sleeve 98. An optional shim plate 112 can be positioned between the pad 102 and the surface 114 of the top shield assembly 40.

Operatively, the energy absorber structure 50 bears upon the top shield assembly 40 and holds the assembly in place during normal nuclear power plant operation and during any pressure increases in the reactor vessel 30 that do not exceed a determinable value. Assuming, for example, that an explosion were to occur in the reactor vessel 30 where the ensuing blast pressure exceeded the determinable pressure value, the rise of the top shield assembly 40 from its position in the operating floor 26 is controlled by the energy absorber columns 88 that transmit the resulting load to the network of support girders 96, i.e., a "strong back." The network of support girders 96 in turn transmits the load directly to the reactor building base through the anchor-support plates 90. The controlled rise of the top-shield assembly 40 is dependent upon the energy absorber structure 50, and particularly upon the energy absorber columns 88.

Referring to FIG. 5, the energy absorber column 88 of FIG. 4 is shown after a controlled stroke which absorbs the energy of the lifting top shield assembly 40 and develops a constant force through a determinable stroke. As the top shield assembly 40 lifts, it bears upon the shim 112/pad 102 and forces the guide tube 100 to move with the top shield assembly. The compressive load on the cylindrical shell 106 increases and the cylindrical shell begins to buckle in accordance with the principles of buckling shells.[2] Buckling of the cylindrical shell 106 occurs generally at the end portions 116 and 118 of the shell and continues until the buckled shell has a length $l/4$, i.e. about one-fourth the normal length $l$. The motion or stroke of the guide tube 100 is controlled (1) in direction by the guide shell 98, and (2) in rate by the buckling of the cylindrical shell 106. The result is an energy absorber structure 50 capable of absorbing energy with a constant force through a controlled stroke.

As an illustrative example, one energy absorber structure 50 for a nuclear power plant has an overall plan diameter of about 24 feet (see FIG. 3) with the network of support girders 96 formed from one-inch steel plate. Each guide sleeve 98 is about four feet long with a 10.75-inch outer diameter. The guide tube 100 extending through the guide sleeve is about eight feet long with a 8.625-inch outer diameter and a two-inch thick pad 102. The cylindrical shell 106 is four feet long with a 10-inch outer diameter and one-half inch thickness. The resulting energy absorber structure is of high strength, built-up, ribbed steel plate construction with energy absorbing guided crush columns. It is capable of absorbing $60 \times 10^6$ foot pounds (ft.-lb.) of energy with a constant force of $20 \times 10^6$ lb. through a three-foot stroke. The structure is capable of holding without motion a 500 pounds per square inch pressure beneath the top shield assembly, e.g., in the reactor vessel. It is contemplated that any combination of stroke length and holddown force can be used to meet the imposed energy loads. The specific values would be determined by such factors as available space, cost effectiveness, building mass, etc.

Referring again to FIG. 2, a missile catcher 120 is connected to ring member 56 to protect the inner containment dome 42 from any control rod drives that are within the volume generally defined by the ring member and the missile catcher. These control rod drives could be propelled away from the operating floor by an explosion in the reactor vessel and rupture the containment barriers if not otherwise retained.

The inner containment dome 42 is positioned on a permanently mounted ring 124 that is connected to the vault barrier liner 24. A plurality of similar removable bolts 126 connect the inner containment dome 42 to the ring 124 so that access to the energy absorber structure 50 and to the reactor is possible.

It is contemplated that the energy absorber structure 50 can be connected directly to the inner containment dome 42 so that a developed load would be transmitted to the base of the reactor building through the containment dome which is connected either to the permanently mounted ring or directly to the base of the reactor building by the removable bolts or similar quick-release devices. It is also contemplated that in certain nuclear power plants it may be desirable to position the energy absorbing columns of my invention within the reactor vessel, that is, beneath or as part of the top shield assembly. The energy absorbing columns would then react through the top shield assembly into the reactor building. The integral top shield-energy absorbing structure would not have to be removed to permit fuel handling operations and could also be used as the containment barrier where desirable.

As will be evidenced from the foregoing description, certain aspects of the invention are not limited to the particular details of construction as illustrated, and it is contemplated that other modifications and applications will occur to those skilled in the art. It is, therefore, intended that the appended claims shall cover such modifications and applications that do not depart from the true spirit and scope of the invention.

I claim:
1. In a nuclear power plant wherein a nuclear reactor building has a top shield assembly covering a reactor vessel in which a reactor core is positioned having fissionable material, the combination thereof with the top shield assembly of an energy absorber structure comprising:
 (a) support means adjacent the top shield assembly,
 (b) energy absorbing means carried by said support means and extending from said support means, said energy absorbing means bearing upon the top shield assembly and absorbing a force load acting upon the top shield assembly when the force load exceeds a preselected force load value, and
 (c) force transmitting means connected between said support means and the nuclear reactor building, said force transmitting means maintaining said support means in a spaced-apart relationship with the top shield assembly so that dislocation of the top shield assembly under the developed force load is controlled by said energy absorber means that transmit the resulting load to said support means which in turn transmit the load directly to the nuclear reactor building through said force transmitting means thereby preventing damage to the nuclear reactor building and maintaining the mechanical integrity of the reactor building.

2. The energy absorber structure of claim 1 in which said support means comprises a network of support girders adjacent the top shield assembly, the network comprising:
 (a) a ring member suitably positioned to receive nuclear reactor components selectively extending through the top shield assembly into the reactor vessel,
 (b) radially extending girders connected to said ring member, and further having terminal ends,
 (c) an outer ring member connected to said terminal ends, and
 (d) a generally circular girder positioned between said ring member and said outer ring member,
 (e) said radially extending girders and said circular girder intersecting in a common plane defined by said network and thereby developing a plurality of spaced network intersections.

---

[2] Timoshenko & Gere, Theory of Elastic Stability, ch. 11 (2d ed. 1961).

3. The energy absorber structure of claim 2 in which said energy absorbing means comprises a plurality of energy absorbing columns individually positioned at selected ones of said network intersections, each of said energy absorbing columns comprising:
   (a) a guide sleeve connected to said network intersection and having a longitudinal axis defined by said sleeve positioned generally perpendicular to the common plane defined by said network,
   (b) a guide tube extending through said guide sleeve, said guide tube including
      (1) pad means at one end of said tube bearing upon the top shield assembly and adapted to receive the developed force load, and
      (2) adjustment means at the other end of said tube, and
   (c) a cylindrical shell positioned between said pad and the other end of said guide sleeve, said adjustment means bearing upon said one end of said guide sleeve placing said cylindrical shell under an initial compressive load.

4. The energy absorber structure of claim 3 in which said adjustment means comprises:
   (a) a threaded end at the other end of said tube extending beyond one end of said guide sleeve, and
   (b) an adjustable collar engaging said threaded end and bearing upon said one end of said guide sleeve.

5. The energy absorber structure of claim 2 in which said force transmitting means comprises a plurality of anchor-support plates individually connected to said outer ring member of said network at selected circumferentially spaced apart positions generally coincident with said terminal ends of said radially extending girders of said network, and further connected to the nuclear reactor building.

6. In a nuclear power plant wherein a nuclear reactor building has a top shield assembly covering a reactor vessel in which a reactor core is positioned having fissionable material, the combination thereof with the top shield assembly of an energy absorbing column comprising:
   (a) guide means connected to the nuclear reactor building, said guide means having a longitudinal axis positioned generally perpendicular to a plane defined by the top shield assembly,
   (b) guide member means extending through said guide means, said guide member means including
      (1) pad means at one end of said guide member means adapted to receive a developed force load, and
      (2) adjustment means at the other end of said guide member means extending beyond one end of said guide means and thereby bearing upon said one end of said guide means, and
   (c) cylindrical shell means positioned between said pad means and the other end of said guide means, said adjustment means bearing upon said one end of said guide means placing said cylindrical shell means under an initial compressive load so that a developed force load that exceeds a preselected force load value is controlled by the buckling of said cylindrical shell means that transmits the resulting load through said guide member means to said guide means which in turn transmits the load to the nuclear reactor building thereby preventing damage to the nuclear reactor building and maintaining the mechanical integrity of the reactor building.

7. The energy absorbing column of claim 6 in which said guide means is a guide sleeve.

8. The energy absorbing column of claim 6 in which said guide member means is a guide tube.

9. The energy absorbing column of claim 6 in which said cylindrical shell means is a cylindrical shell having a preselected buckling rate.

10. In a nuclear power plant wherein a nuclear reactor building has a top shield assembly rotatably covering a reactor vessel in which a reactor core is positioned having fissionable material, the combination thereof with the top shield assembly of an energy absorber structure comprising:
   (a) a network of support girders adjacent the top shield assembly, the network comprising:
      (1) a ring member suitably positioned to receive nuclear reactor components selectively extending through the top shield assembly into the reactor vessel,
      (2) a sector ring member connected to said ring member and having a sector axis,
      (3) radially extending girders connected to respective ones of said ring member and said sector ring member, and further having terminal ends,
      (4) an outer ring member connected to said terminal ends, said outer ring member having an outer ring axis generally coincident with the sector axis,
      (5) a first circular girder concentric without and and spaced from said ring member,
      (6) a second circular girder concentric within and spaced from said outer ring member,
      (7) at least first and second sector girders spaced apart generally concentric without and spaced from said sector ring member, and
      (8) intermediate girders selectively connected between said ring member and said first circular girder, and between said first circular girder and said sector ring member,
      (9) said radially extending girders and said first and second sector girders and said first and second circular girders intersecting in a common plane defined by said network and thereby developing a plurality of spaced-apart network intersections,
   (b) a plurality of energy absorbing columns individually positioned at selected ones of said network intersections, each of said energy absorbing columns comprising:
      (1) a guide sleeve connected to said network intersection and having a longitudinal axis defined by said sleeve positioned generally perpendicular to the common plane defined by said network,
      (2) a guide tube extending through said guide sleeve, said guide tube including
         (i) a pad at one end of said tube bearing upon the top shield assembly,
         (ii) a threaded end at the other end of said tube extending beyond one end of said guide sleeve, and
         (iii) an adjustable collar engaging said threaded end and bearing upon said one end of said guide sleeve,
      (3) a cylindrical shell positioned between said pad and the other end of said guide sleeve and maintained under an initial compressive load, and
   (c) a plurality of anchor-support plates individually connected to said outer ring member of said network at selected circumferentially spaced-apart positions generally coincident with said terminal ends of said radially extending girders of said network, and further connected to the nuclear reactor building so that dislocation of the top shield assembly under a developed force load that exceeds a preselected force load value is controlled by said energy absorber columns that transmit the resulting load to said network which in turn transmits the load directly to the nuclear reactor building through said anchor-support plates thereby preventing damage to the nuclear reactor building and maintaining the mechanical integrity of the reactor building.

11. The energy absorber structure of claim 10 in which said network further comprises a missile catcher connected to said ring member and generally enclosing the nuclear reactor components extending through said ring member.

References Cited

UNITED STATES PATENTS 3,056,736   10/1962   Went et al. _____ 176—37

FOREIGN PATENTS 666,340   3/1965   Belgium _____ 176—87

CARL D. QUARFORTH, Primary Examiner

H. E. BEHREND, Assistant Examiner

U.S. Cl. X.R.

176—87